United States Patent

[11] 3,626,405

[72] Inventor Takao Yamamoto
Fujisawa, Japan
[21] Appl. No. 6,989
[22] Filed Jan. 30, 1970
[45] Patented Dec. 7, 1971
[73] Assignee Shinko Tsushin Kogyo Kabushikikaisha represented by Yasukazu Watanabe
Kanagawa-ken, Japan
[32] Priority Feb. 1, 1969
[33] Japan
[31] 44/7460

---

[54] A D CONVERTER
17 Claims, 17 Drawing Figs.

[52] U.S. Cl. .......... 340/347 P
[51] Int. Cl. .......... G08c 9/00, G08c 9/06
[50] Field of Search .......... 340/347 P

[56] References Cited

UNITED STATES PATENTS

| | | | |
|---|---|---|---|
| 3,246,316 | 4/1966 | Saylor .......... | 340/347 |
| 3,239,142 | 3/1966 | Levine .......... | 340/347 |

*Primary Examiner*—Maynard R. Wilbur
*Assistant Examiner*—Jeremiah Glassman
*Attorney*—John Lezdey

ABSTRACT: An analog digital converter comprising a first system for conversion of decimal numbers in all FIGS., in which an alternate ON-OFF signal is emitted from a photoelectric element whenever a divisional zone of minimum units having alternate transparent and opaque portions of uniform width shifts the minimum unit; a second system for indication of decimal numbers in each FIG., in which one among 10 photoelectric elements, but adjacent two at every converting borders, are exposed to passing light whenever divisional zones in which respective transparent portions each having a width equivalent to that of the minimum unit, $10^n$, *n* means each FIG. where one place down from each pertinent FIG. and the same hereinafter, plus marginal width sufficient to cover at least one slit each on both sides of the transparent portions and are arranged centering in each phase corresponding to every $10^{n+}$th unit of the minimum units shift equivalent to the width of each $10^n$ of the minimum unit; a third system for advance of FIGS., in which alternate compound ON-OFF signals are emitted from each pairs of photoelectric elements connected with ON side and OFF side respectively at the output of each photoelectric element for the highest number in each FIG. where one place down whenever each pairs of divisional zones consisting of alternately compound transparent and opaque portions each having a width equivalent to that of the minimum unit, $10^n$, plus marginal width sufficient to cover at least one slit on both sides of the compound transparent portions shift equivalent to the width of each $10^n$, of the minimum unit; and circuit which, by the switching of the ON-OFF signals given from the divisional zones in the first and the third systems, distribute electric current alternately to the photoelectric elements divided into two groups of odd and even numbers in each figure.

TAKAO YAMAMOTO INVENTOR

BY John Legdey ATTORNEY

TAKAO YAMAMOTO INVENTOR
BY John Lezdey
ATTORNEY

TAKAO YAMAMOTO INVENTOR

BY John Lezdey ATTORNEY

TAKAO YAMAMOTO INVENTOR

BY John Lezdey

ATTORNEY

TAKAO YAMAMOTO INVENTOR

BY John Lezdey ATTORNEY

TAKAO YAMAMOTO INVENTOR

BY John Lezdey

ATTORNEY

TAKAO YAMAMOTO INVENTOR

BY John Lezdey

ATTORNEY

TAKAO YAMAMOTO INVENTOR

BY John Lezdey

ATTORNEY

TAKAO YAMAMOTO INVENTOR

BY John Lezdey

ATTORNEY

TAKAO YAMAMOTO INVENTOR

BY John Lezdey ATTORNEY

A D CONVERTER

The present invention relates to analog digital converter of photoelectric conversion type and particularly the type in which analog data produced from changes of shaft angles are coded.

In conventional AD converters, analog data in the form of an angular shaft position are mostly converted firstly to binary code as in Gray Code (alternating binary code) or in binary coded decimal system and then binary code is converted to decimal code, which requires additional code conversion circuit at additional expenses. An object of the present invention is to improve the foregoing defect and to provide a more compact and economic AD converter which enables to convert shaft angles directly into decimal numbers without once converting into binary code.

However, there exists the following conventional type of an AD converter which codes the shaft angles directly into decimal code on a rotary disc. The said type of an AD converter, used in a scale manufactured by Kubota Iron Works Co. Ltd., employs the principle of a double-brush system applied to the photoelectric conversion system in order to prevent inaccuracy of code conversion occurable near the borderlines between the opaque area and the transparent parts. In this mechanism, for example, the smallest divisional groups along a circumference must comprise 2,000 units in order to indicate from minimum 1 to maximum 1,000, which consequently requires 20 photoelectric elements per figure for decimal number indication, as well as a large rotary disc. Another object of the invention is to improve the foregoing defect and to provide a compact, highly efficient and economical AD converter of a unique figure-increasing system capable of eliminating inaccuracy in reading codes near at the said borderlines, and of indicating converted decimal numbers at minimum units of 1 and 2 not to mention of 5, using only half the photoelectric elements of the said conventional AD converter as well as only half the space to obtain equal indications.

Now, in coding shaft rotation angles by a rotary disc the binary system has been preferred to the decimal system and has been extensively used mainly because there has been no other appropriate system but the double brush system and the V-Scan system to prevent inaccuracy in the borderlines, and also because much more reading elements are required in the decimal system than in the binary system when the reading elements, namely brush or the photoelectric elements with slit, are set in a line along the radial direction of a rotary disc, resulting in a impossibility of arrangement. However, the defect is improved when the reading elements are scattered to the circumferential direction instead of the conventional arrangement along the radial direction. The improvement was realized by the prior Japanese Pat. No., Showa, 40 (1965)-23,156 (Applicant: Nippon Electric Company Limited) in which the AD converter has a slit arrangement mechanism where a movement of a minimum unit of movable slits concentrically arranged on a rotary disc meets one by one with a slit of fixed slits arranged coincidentally with the said concentricity on a fixed disc. However, the said mechanism of the said conventional converter did not accompany a device to take up figures and could not convert and indicate numbers of plural figures, and consequently its function was merely of an AD converter as a pulse generator. A further object of the invention is to improve the foregoing defect and to provide an AD converter of a unique figure-up system capable of indicating converted decimal numbers without ambiguity for borderline digits.

A prior art of AD converter being capable of direct indication of decimal numbers was disclosed as a brush contact type in U.S. Pat. No. 3,246,316. Wherein inaccuracy of number conversion occurable at the both sides of the conductive portions for the output indication of decimal numbers was prevented in combinations with two divisional zones. The one division was arranged conductive and nonconductive portions of uniform width and from which alternate ON-OFF signal was generated. The other division was extended the both sides of the conductive portions thereof so as to be more wide than a pertinent width and was divided into two groups of which the one group assigned to even numbers and the other group assigned to odd numbers. The alternate ON-OFF signal selected either the even or the odd numbers respectively.

However, as divisional interval between the even and the odd numbers was arranged to coincide directly with that between the conductive and the nonconductive portions on the basic division as an inevitable consequence of the construction in the brush contact type the above art required two rows of the divisions for the output of indication of decimal numbers in each figure and 18 rows of the divisions for three figures so that it realized with three stages related muturely through two gear reduction mechanisms. It had to avoid to arrange in one stage for the cause of a low resolution as well as a large diameter. It was difficult and inappropriate in view of substantial difference of construction to change the art into a rearrangement of a photoelectric noncontact type of the AD converter. A more further object of the invention is to improve the foregoing defect and to provide an AD converter having single stage consisting of only eight rows of divisions for three figures and a high resolution in spite of a small diameter without any gear reduction mechanism.

In conventional AD converters of rotary shaft type which are capable of indicating numbers in negative area, a special complementary conversion circuit is required as a device to convert numbers in adverse order into normal order, which means a more complex and large mechanism and a hindrance of cost reduction. A still further object of the invention is to improve the said defect and to provide an AD converter capable of indicating numbers in both plus and minus areas without complementary conversion circuit.

The foregoing objects are successfully accomplished by the following constructional idea. All the concentric divisional zones on a rotary disc (disc pattern) are divided into the following two subdivisions for all figures ($10^n$),

*a.* Subdivisions to indicate decimal numbers in each figure ($10^n$)

*b.* Subdivisions to convert (or figure up) decimal numbers in each figure ($10^n$)

where each transparent part in the said subdivisions to indicate decimal numbers in each figure ($10^n$) coincides with each photoelectric conversion element furnished to each digit when a minimum angular shaft changes in each figure basically, and each of the decimally adjoining two digits in a borderline for numbering notation is so positioned as overlaps with each other in respective transparent parts, and where the minimum divisional zone in the said subdivisions to convert decimal numbers are further divided into the smallest units of transparent parts and opaque parts of uniform width; and by the correlationship between the said minimum divisional zone and a photoelectric conversion element with single slit, on-off signal is produced out of a two-point switching circuit positioned in the output side of the said element, and the said on-off signal is endowed with a function to determine

*a.* to convert and figure up decimal numbers in all figures ($10^n$)

*b.* to indicate decimal numbers in all figures ($10^n$) in order that all numbers will be indicated and that ambiguity in borderlines will be eliminated. In other words, all the photoelectric conversion elements for indicating serially adjoining numbers are divided into two alternate groups and the input sides of the said groups for the lowest figure are directly connected with the output side of the above-mentioned two-point circuit, while the input side of the two groups in all figures except the lowest figure is connected with the output side of a pair of figure-increasing photoelectric conversion elements which are connected to the output side of the photoelectric conversion elements for indicating the lowest or highest figure in the next place ($10^{n-1}$) below to the corresponding figure ($10^n$), furthermore, every slit of a pair of photoelectric conversion elements for converting numbers in the every figure are put in a phasic relation with the said divisional zones for figuring up decimal number in every said figure. A preferred embodiment of the invention will now be more fully described with reference to the accompanying drawing.

The invention will be better understood from the following description of preferred embodiments shown by way of example in the accompanying drawings in which, FIG. 1 is a side view of vertical section illustrating schematically the construction of the main part of a conventional AD converter of photoelectric conversion type with rotary shaft.

FIG. 2 is a rectangularly modified front view of a fan-shaped section taken out of the rotary disc (disc pattern) to be used in the invention, comprising the divisional zones consisting of transparent parts and opaque area which code the shaft rotation angles into decimal numbers of up to three figures inclusive ($10^0 10^1$, $10^2$).

FIG. 3 is a rectangularly magnified and fragmentary front view illustrating the relativity among the said divisional zones of the rotary disc, slits of the fixed disc set behind and in nearly contact with the rotary disc, and photoelectric conversion elements set behind the slits, which code the shaft rotation angles into decimal numbers of up to two figures inclusive ($10^0$, $10^1$) at the minimum unit 1.

Figure 1:
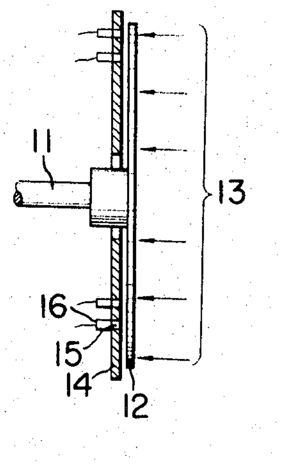
Figure 2:
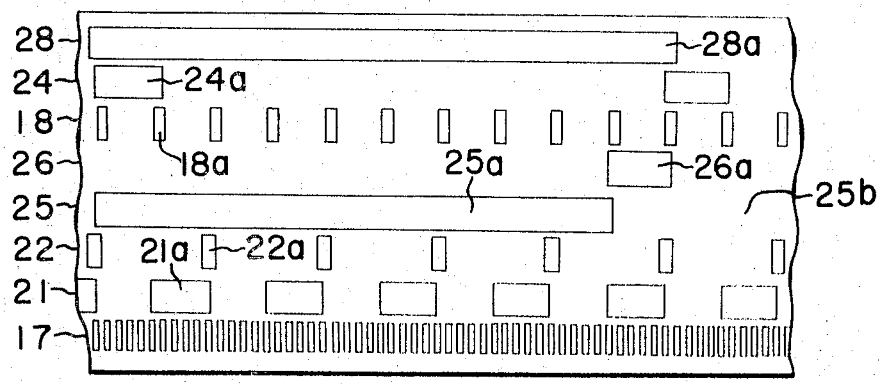
Figure 3:
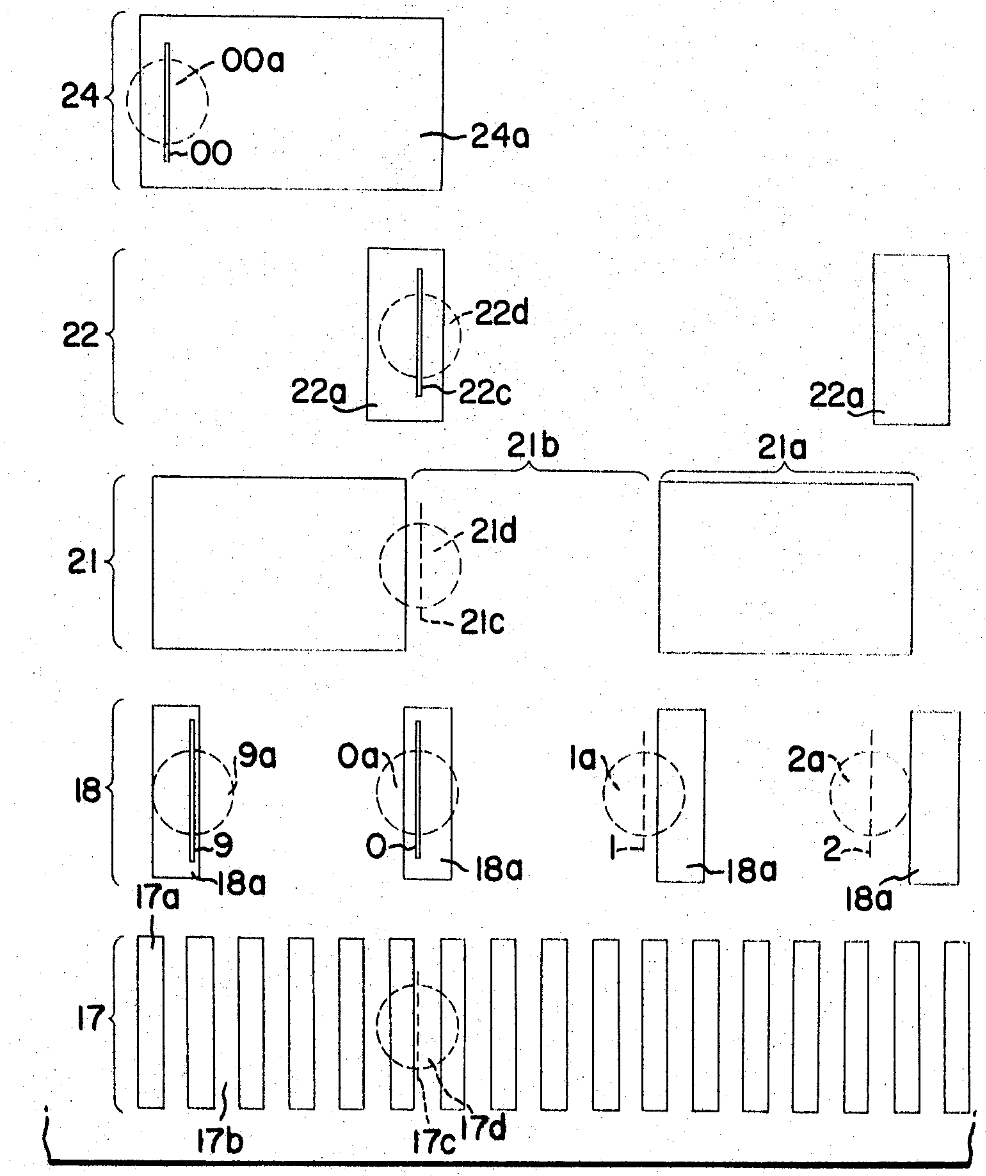
Figure 7:
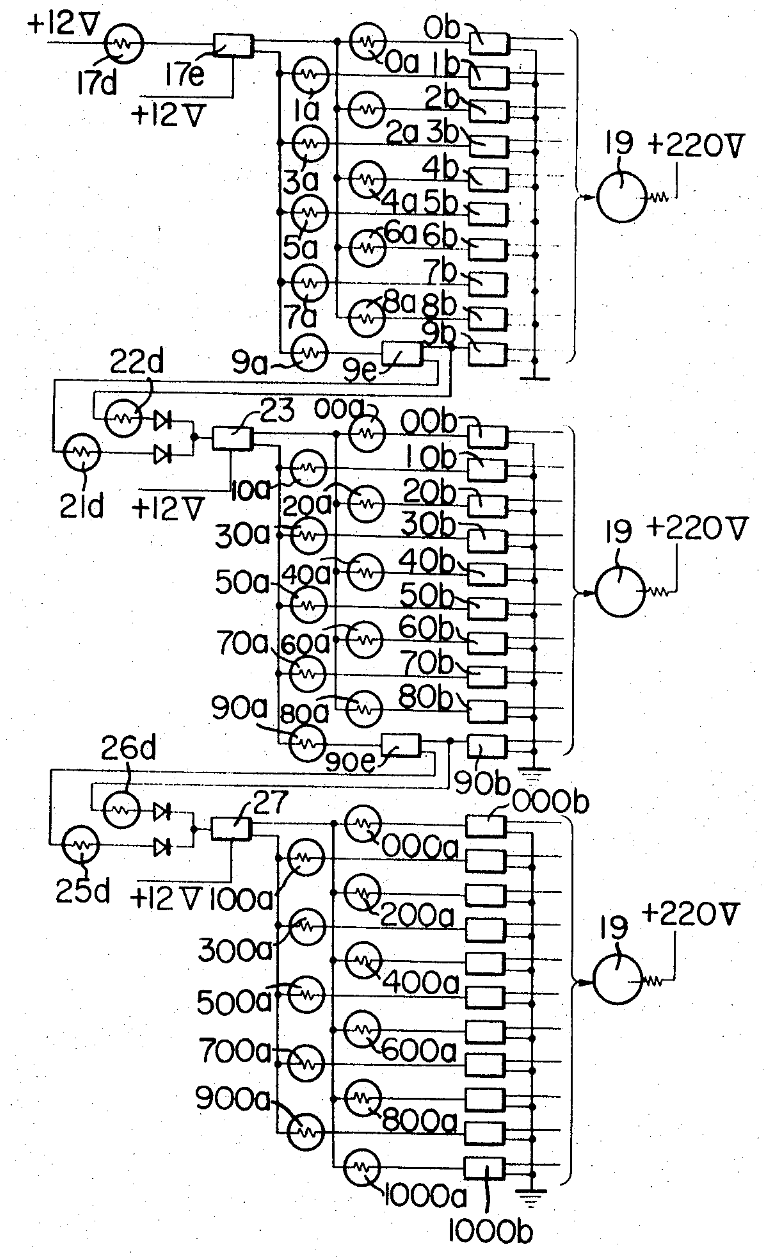
FIG. 7 is an electric circuit diagram of a main part which enables to indicate decimal numbers from minimum unit 1 to maximum indication 1,000.
Figure 17:
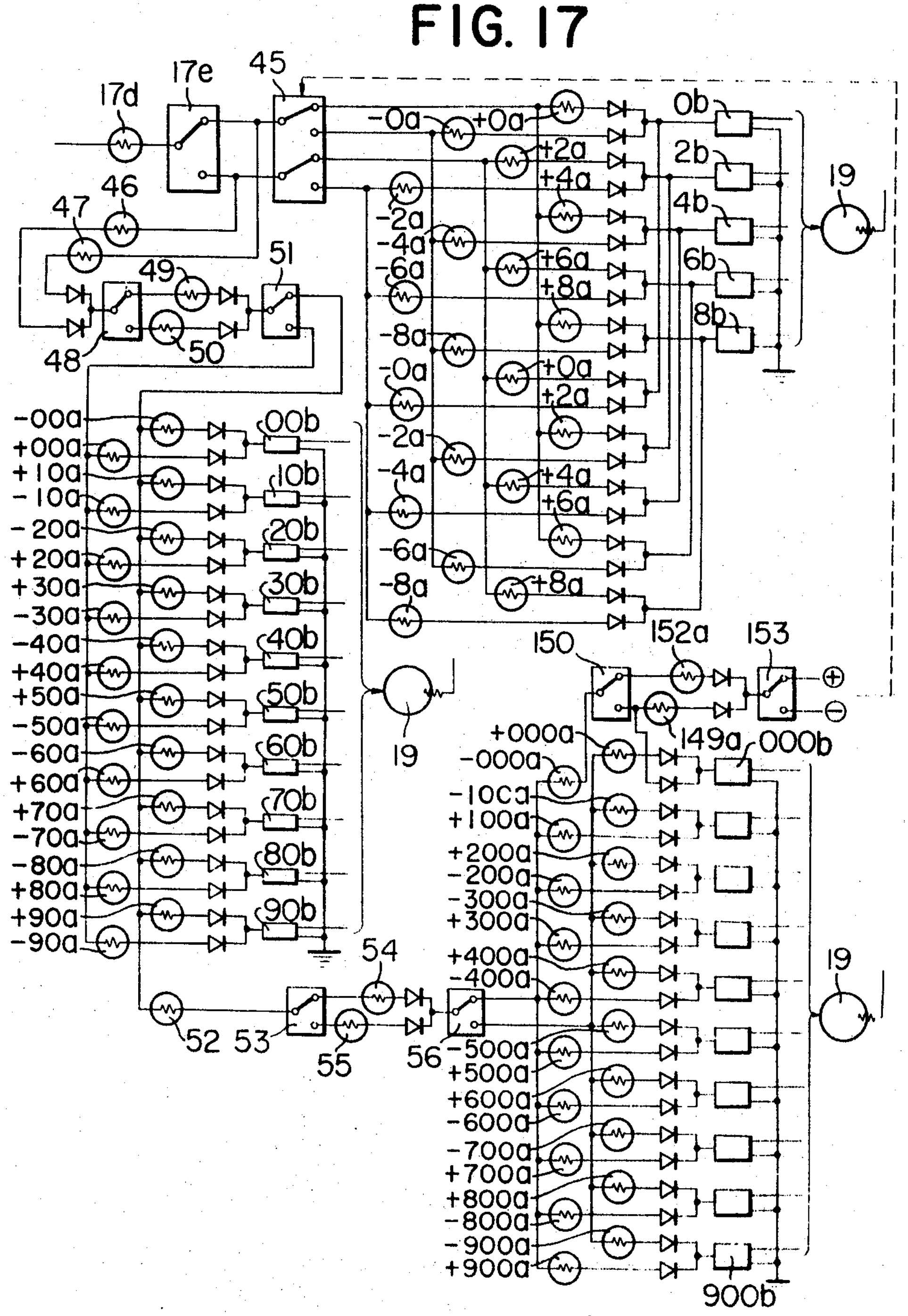
FIG. 17 illustrates an electric circuit of a main part which enables to indicate decimal numbers from minimum unit 2 to maximum indication ±999.

In FIG. 1, 11 shows a rotary shaft which conveys analog data by changing shaft angles, and 12 is a rotary disc (disc pattern) securing the rotary shaft 11 firmly to its center. Divisional zones consisting of transparent parts and opaque area are concentrically formed on the rotary disc 12. 13 illustrates rays from light source incident upon its one side of the rotary disc 12; parallel rays of light are poured upon the divisional zones through spaces limited by use of, for example, optical fibers. 14 is a fixed disc, set close to the rotary disc 12 and fixed to a casing not shown therein. 15 is one of slits made in the fixed disc 14, each slit being put in corresponding position to the said divisional zones. Behind each slit is provided a photoelectric conversion element 16 which functions as a detector to detect transmitting light through the transparent part and slit when the two are in coincidence, and to convert the data into electric code; cadmium sulfate cell(cds), phototransistor or solar battery, etc., is used as the detector. In FIG. 2 and 3, 17, consisting alternatingly of transparent parts 17*a* and opaque parts 17*b* of uniform size, is a basic divisional zone of minimum units for converting and figuring up decimal figures and for indicating decimal code of all figures ($10^n$), and is arranged in the most circumferential zone in the rotary disc 12. 17*c* is a slit made in the fixed disc 14 corresponding with every unit of the divisional zone 17, while 17*d* is a photoelectric element set behind a slit 17*c*. As shown in FIG. 7, the photoelectric element is incessantly supplied with operating electric current. 17*e* is a two-point switching circuit, such as Schmidt circuit or relay circuit, set on the output side of the photoelectric element 17*d*, and its function is to switch and supply electric current to one side on the output side in reply to ON signal raised when the slit 17*c* is in the transparent part 17*a* under mutual relationship between the minimum divisional zone 17 and the slit 17*c*, and to switch and supply electric current to opposite side on the output side in reply to OFF signal raised when the slit 17*c* is in the opaque part 17*b*.

18 is a divisional zone to indicate decimal numbers of first figure ($10^0$). 18*a* are transparent parts in the divisional zone 18, each individual part having a width equivalent to that of one unit of the divisional zone 17 plus a marginal width, on both sides of the part, to cover at least one slit, and all the parts 18*a* being positioned at a uniform interval equivalent to 10th units in the minimum divisional zone 17, from centerline to centerline. 0, 1, 2 ... 9 and 10 slits in the fixed disc 14, arranged in the positions corresponding to the divisional zone 18 basically at such an interval as one slit appears in a transparent part 18*a* according as every 10 units of the minimum divisional zone change angularly; at the same time, these 10 slits are also disposed at such an interval as a pair of the adjoining slits among them will appear in a pair of the adjoining transparent parts 18*a* so that rays of light may penetrate through the two simultaneously. 0*a*, 1*a*, 2*a* ... 9*a* are 10 photoelectric elements set behind the said slits, and all the elements are controlled under two systems where every alternate element belongs to one system while the adjoining two elements belong to the other system, for example, if one side are even numbers only, the other side are odd numbers only. The input side of all the elements of the two systems is connected respectively with the output side of the said two-point switching circuit 17*e*. Accordingly, in case that a pair of adjoining transparent parts in the divisional zone 18 receives light when one slit and the adjoining slit (for instance, slit 9 and slit 0) is appearing in one and the other transparent parts respectively, output is not produced in both of the photoelectric elements simultaneously, but is produced only in one photoelectric element which is provided with electric current by the two-point switching circuit 17*e* set in the output side of the said photoelectric element 17*d*: for example, in FIG. 7 output is no more operating in the photoelectric 9*a* but is operating in the photoelectric element 0*a*. 0*b*, 1*b*, 2*b* ... 9*b* are decimal number indication circuits and 19 is a decimal number indication tube.

Figure 8:
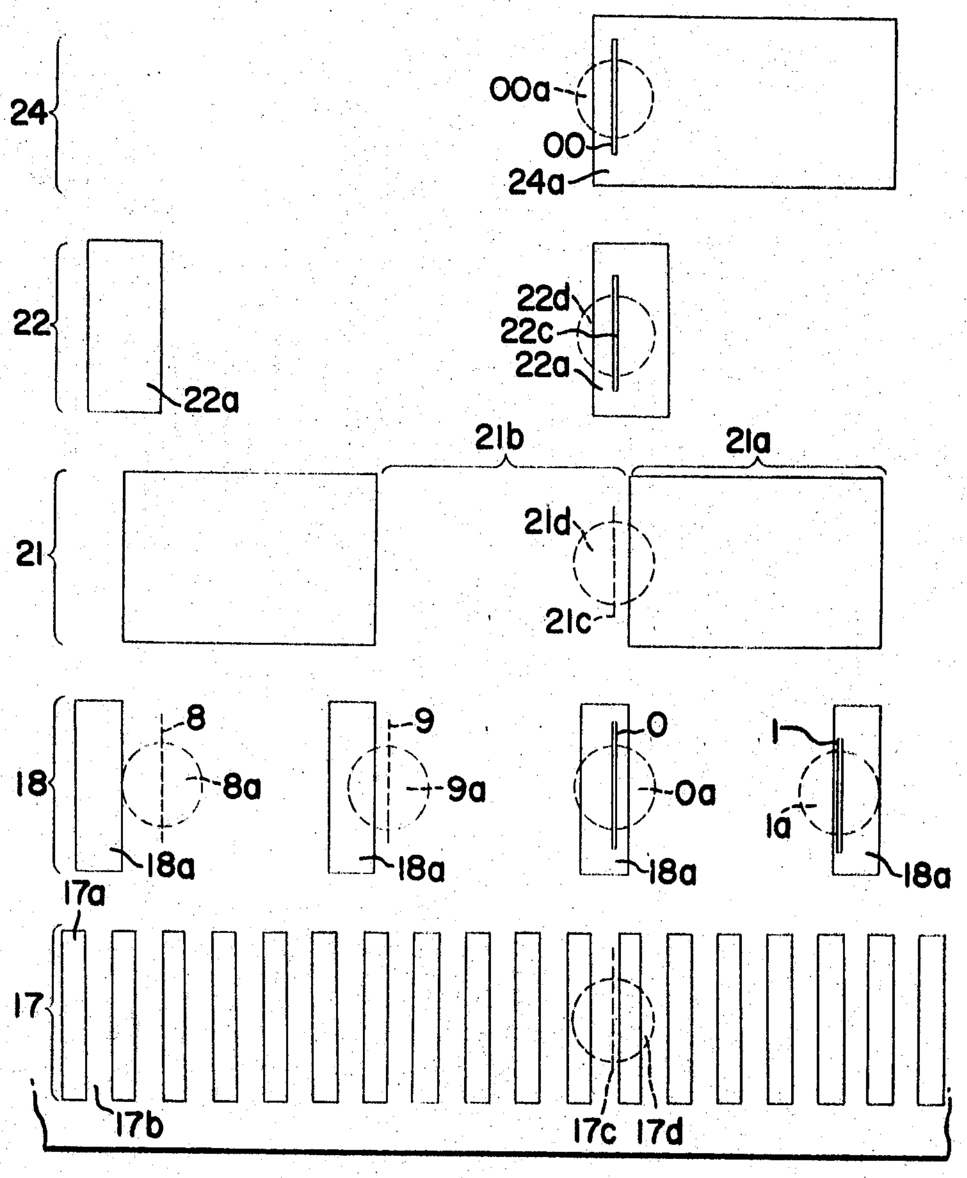
FIG. 8 is a magnified fragmentary front view illustrating a modification of FIG. 3.

In FIG. 3, 21 and 22 show a pair of divisional zones which are used to convert numbers of second figures ($10^1$), or in other words which are used to take numbers of first place ($10^0$) up one place into numbers of second place; in the one divisional zone 21, transparent parts 21*a* are arranged at a uniform interval from centerline to centerline, equivalent to the width of 20 units of the minimum divisional zone 17, each transparent part having a width equivalent to that of nine units plus a marginal width, on both sides of the part, sufficient to cover at least one slit; while in the other divisional zone 22, transparent parts 22*a* are arranged at a uniform interval, from centerline to centerline, equivalent to the width of 20 units of the minimum divisional zone 17, each transparent part having a width equivalent to that of one unit plus a marginal width, on both sides of the part sufficient to cover at least one slit. And yet each pair of a transparent part 21a and a corresponding transparent part 22a is so made as the former takes charge of nine units of the minimum divisional zone 17 and the latter takes charge of one unit thereof; 10 units in total, or for one figure. 21c is a slit made in the fixed disc in correspondence to the divisional zone 21, while 22c is a slit made in the fixed disc in correspondence to the divisional zone 22; the pair of the slits 21c and 22c is correlatively positioned as when the slit 22c is in a transparent part 22a the slit 21c is on the borderline between the corresponding transparent part 21a and the opaque part 21b. Therefore, then the pair of the slits are set in a same phase (FIG. 3, FIG. 8), the centerline of the corresponding transparent part 22a must fall on either of the side-borderlines of the corresponding transparent part 21a, although whether it falls on the counterclockwise borderline (FIG. 3) or on the clockwise borderline (FIG. 8) is decided, as described below, whether the figure increasing operation is made associate with the largest number 9 in the next rank right beneath (FIG. 3) or with the smallest number 0 therein (FIG. 8). When a pair of the slits are set in a different phase (FIG. 9), the corresponding transparent part is positioned apart from the borderlines of the corresponding transparent part 21a accordingly. 21d and 22d are a pair of photoelectric elements provided behind the corresponding slits 21c and 22c. In FIG. 7, 9e is a two-point switching circuit set on the output side of a photoelectric element 9a which indicates the figure 9, the largest figure in the first place ($10^0$), and to its output side moreover the photoelectric elements 21d and 22d are connected in parallel. Namely, the one photoelectric element 21d is connected to the side whereat operating electric current is switched and provided when the output of the photoelectric element 9a is absent (OFF), and the other photoelectric element 22d is connected to the side whereat operating electric current is switched and provided when the output of the photoelectric element 9a is present (ON). 23 is a two-point switching circuit to turn the output of the pair of the parallel photoelectric elements 21d and 22d into input.

The outputs obtainable by the pair of the photoelectric elements 21d and 22d under the above-mentioned construction are classified in accordance with the units of the minimum divisional zone 17 as follows:

| | | photoelectric element 21d | photoelectric element 22d |
|---|---|---|---|
| output | present (ON) | o–8 | 9 |
| | | 20–28 | 29 |
| | | 40–48 | 49 |
| | | ......... | .... |
| | absent (OFF) | 9–19 | o–8 |
| | | 29–39 | 10–28 |
| | | 49–59 | 30–48 |
| | | ......... | ......... |

Accordingly, the switching classification on the output side obtainable by the two-point switching circuit 23 becomes as follows:

| one side | the other side |
|---|---|
| o–9 | 10–19 |
| 20–29 | 30–39 |
| 40–49 | 50–59 |
| ....... | ....... |

Figure 9:
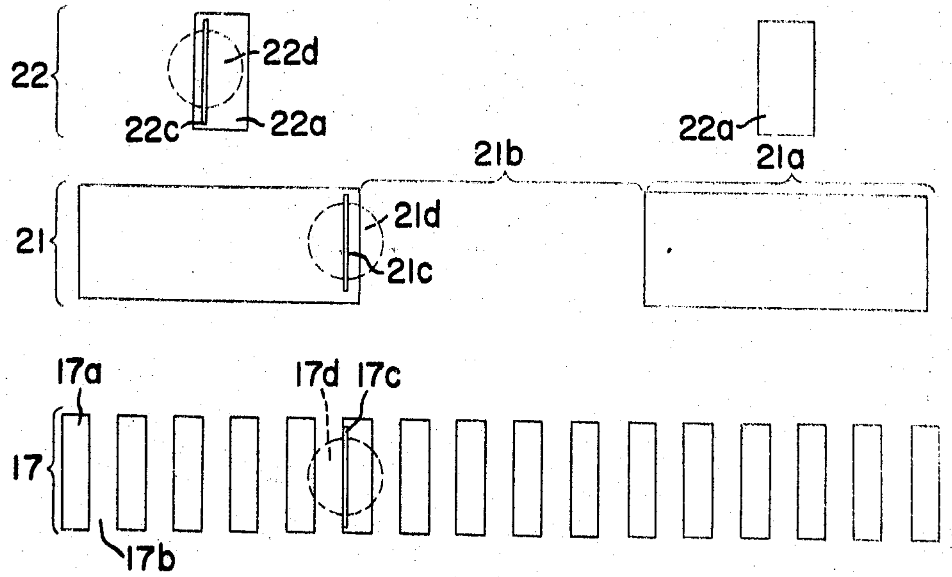
FIG. 9 is a magnified fragmentary front view illustrating another modification of FIG. 3.

Thus, the alternating switchings of 10 pieces of decimal number indication photoelectric elements 00a, 10a, 20a ... 90a for figures in the second place are directly dependent on the existence or nonexistence of the output of the photoelectric element 9a taking charge of indicating the largest figure 9 in the first place ($10^0$), but the photoelectric element 9a on the other hand depends on the output of the photoelectric element 17d, and yet all the transparent parts in the divisional zones except the minimum divisional zone 17 have individually expanded width to cover at least one slit in each side, so that ultimately the switchings are based on the output of the photoelectric element 17d, namely on the uniform-sized minimum units of the minimum divisional zone 17 alone. Consequently, extremely sure operation to advance figure is carried out without least ambiguity.

When a pair of the slits 21c and 22c is set in a same phase and also in association with the photoelectric element 0a, which is in charge of indicating the smallest figure 0 in the first place, for the purpose of operating the increase of figures, in FIG. 8, the centerline of the transparent part 22a and the clockwise borderline of the corresponding transparent part 21a are set in a same phase: a sheer reverse composition of the FIG. 3's.

FIG. 9 shows a related phase between the transparent part 22a and the corresponding transparent part 21a when a pair of the slits 21c and 22c is set in a different phase.

It is not always necessary to set a pair of the slits 21c and 22c in relation to their works to the nearest pair of the transparent parts 21a and 22a for the same effect is obtained by setting a slit 22c in any distant transparent part 22a when a slit 21c is on the borderline of a transparent part 21a.

Figure 12:
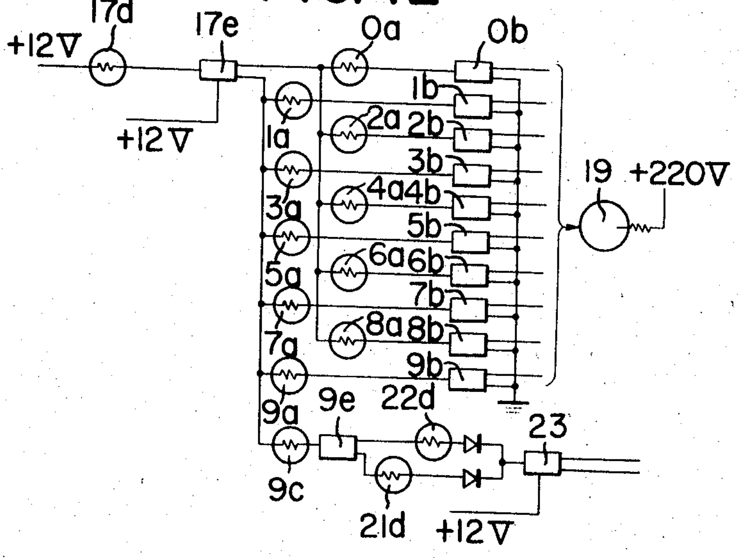
FIG. 12 illustrates another modified electric diagram of FIG. 7 showing an additional circuit to increase figures.

In FIG. 12, the two-point switching circuit is not directly connected to the output side of the photoelectric element 9a in charge of indicating the largest figure 9 in the first place ($10^0$), but the said two-point switching circuit is directly connected to the output side of the photoelectric element 9c behind an another slit positioned in a different phase where it works simultaneously with the said photoelectric element 9a; a modified circuit as it is, it produces same effect as that of FIG. 3.

24 is a divisional zone to indicate decimal figures in the second place ($10^1$) and 24a is one of the transparent parts in the divisional zone 24 arranged at a uniform interval, from centerline to centerline, equivalent to the width of 100 units of the minimum divisional zone 17, each transparent part 24a having a width equivalent to that of 10 units of the minimum divisional zone 17 plus a marginal width, on both sides of the part, sufficient to cover at least one slit. 00, 10, 20 ..... 90 are 10 pieces of slits provided in the fixed disc in correspondence to the divisional zone 24 basically at such an interval as one slit appears in a transparent part 24a according as every 10 units of the minimum divisional zone 17 change angularly; at the same time, these 10 slits are disposed at such an interval as a pair of the serially adjoining slits among them will appear in a pair of the nearest adjoining transparent parts 24a and 24a respectively at the time of figure conversion so that rays of light may penetrate through the two parts simultaneously (FIG. 4). 00a, 10a, 20a .... 90a are 10 pieces of photoelectric elements set behind the said slits, and the input sides of all the said elements are controlled in two systems, as shown in FIG. 7, where every alternate element belongs to one system while the adjoining elements belong to other system. The input sides of the two systems are directly connected respectively with the input side of the above-mentioned two-point switching circuit 23. 00b, 10b, 20b ... 90b are decimal number indication circuits set on the output sides of all the said elements.

Figure 4:
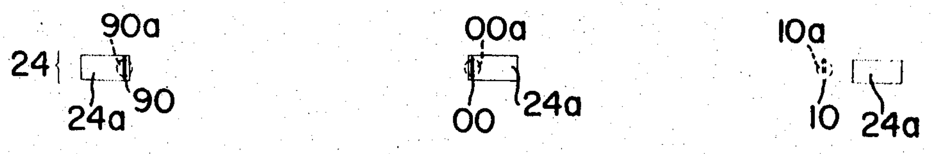
FIG. 4 is a fragmentary front view illustrating the relativity between a divisional zone and the slits which code the shaft rotation angles into decimal numbers of two figures, ($10^1$).
Figure 5:
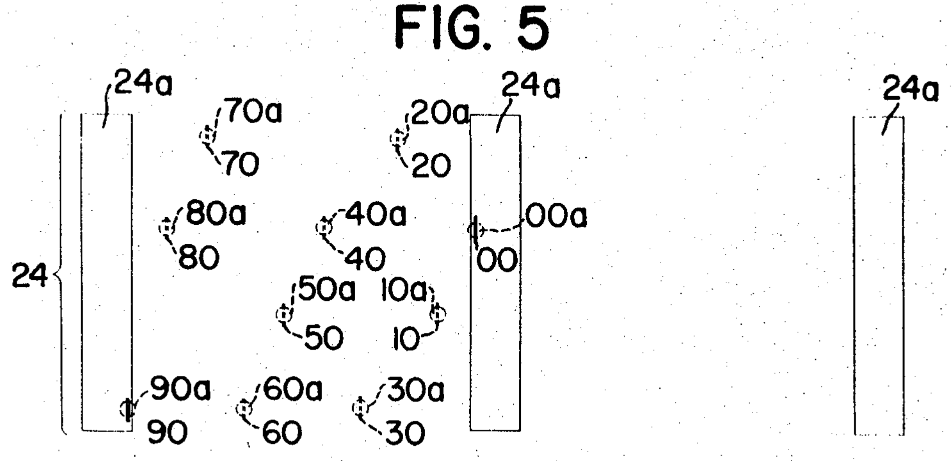
FIG. 5 is a fragmentary front view illustrating a modification of FIG. 4.

FIG. 5 shows magnified transparent parts 24a arranged radially on the said rotary disc and slits 00, 10, 20 ... 90 also arranged radially in scattered positions which is illustrating same effect as FIG. 4.

In FIG. 2, 25 and 26 show a pair of divisional zones which are used to take the figure in the second place ($10^1$) up one place into the figure in the third place ($10^2$); in the one divisional zone 25, transparent parts 21a are arranged at a uniform interval, from centerline to centerline, equivalent to the width of 200 units of the minimum divisional zone 17, each transparent part having a width equivalent to that of 90 units plus a marginal width, on both sides of the part, sufficient to cover at least one slit; while in the other divisional zone 26, transparent parts 26a are arranged at a uniform interval, from centerline to centerline, equivalent to the width of 200 units of the minimum divisional zone 17, each transparent part having a width equivalent to that of 10 units plus a marginal width, on both sides of the part, sufficient to cover at least one slit. And yet each pair of a transparent part 25a and a corresponding transparent part 26a is so made as the former takes charge of 90 units of the minimum divisional zone 17 and the latter takes charge of 10 units thereof: 100 units altogether. Though not shown in the said divisional groups 25 and 26, a pair of slits is provided in the corresponding fixed disc and behind them are set a pair of photoelectric elements 25d and 26d (FIG. 7). As their correlativity is same as in the case of the second place ($10^1$), the description is omitted here. In FIG. 7, 90e is a two-point switching circuit set on the output side of the photoelectric element 90a which takes charge of indicating the largest figure 9 in the second place ($10^1$), and a pair of the photoelectric elements 25d and 26d are connected in parallel to the output side of the said circuit. Namely, the one photoelectric element 25d is connected to the side whereat operating current is switched and provided when the output of the photoelectric element 90a is absent (OFF), and the other photoelectric element 26d is connected to the side whereat operating electric current is switched and provided when the output of the photoelectric element 90a is present (ON). 27 is a two-point switching circuit to turn the output of the pair of the parallel photoelectric elements 25d and 26d into input. The switching classification obtainable by the said circuit 27 is:

| one side | the other side |
|---|---|
| 00–99 | 100–199 |
| 200–299 | 300–399 |
| 400–499 | 500–599 |
| ......... | ......... |

and thus the same operational effect is obtained as in the case of the second place.

Figure 6:
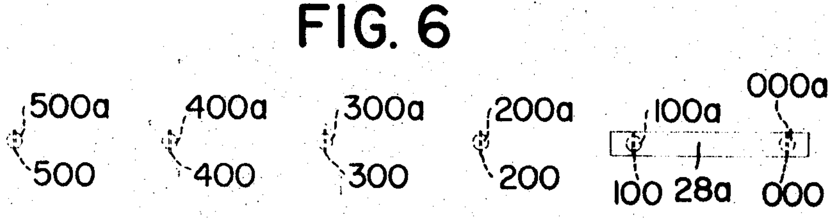
FIG. 6 is a fragmentary front view illustrating the relativity between a divisional zone and the slits which code the shaft rotation angles into decimal numbers of the maximum figures ($10^{n-max}$).

As shown in FIG. 2 and FIG. 6, 28 is a divisional zone to indicate decimal numbers of the third place ($10^2$). On supposition that the said figures are the highest, the said group is described in detail as follows: 28a is a transparent part in the said divisional zone having a width equivalent to that of 100 units of the minimum divisional zone 17 plus a marginal width, on both sides of the part, equivalent to width of at least one slit; 000, 100, 200 .... 900 are 10 slits in the fixed disc disposed on the corresponding positions to the divisional group 28 at a uniform interval equivalent to 100 units of the minimum divisional zone, and it is easy to add the slit 1,000, which takes charge of indicating the figure 1 in the fourth place ($10^3$), to make the number of slit amounts to 11 in total; 000a, 100a, 200a .... 1,000a are the photoelectric elements set behind the corresponding slits, while 000b, 100b, 200b ..... 900b are the decimal number indication circuits set behind the said corresponding elements.

The first embodiment treats with indication of numbers up to 1,000 inclusive, but figures can be increased by repeating the foregoing sequences.

Figure 10:
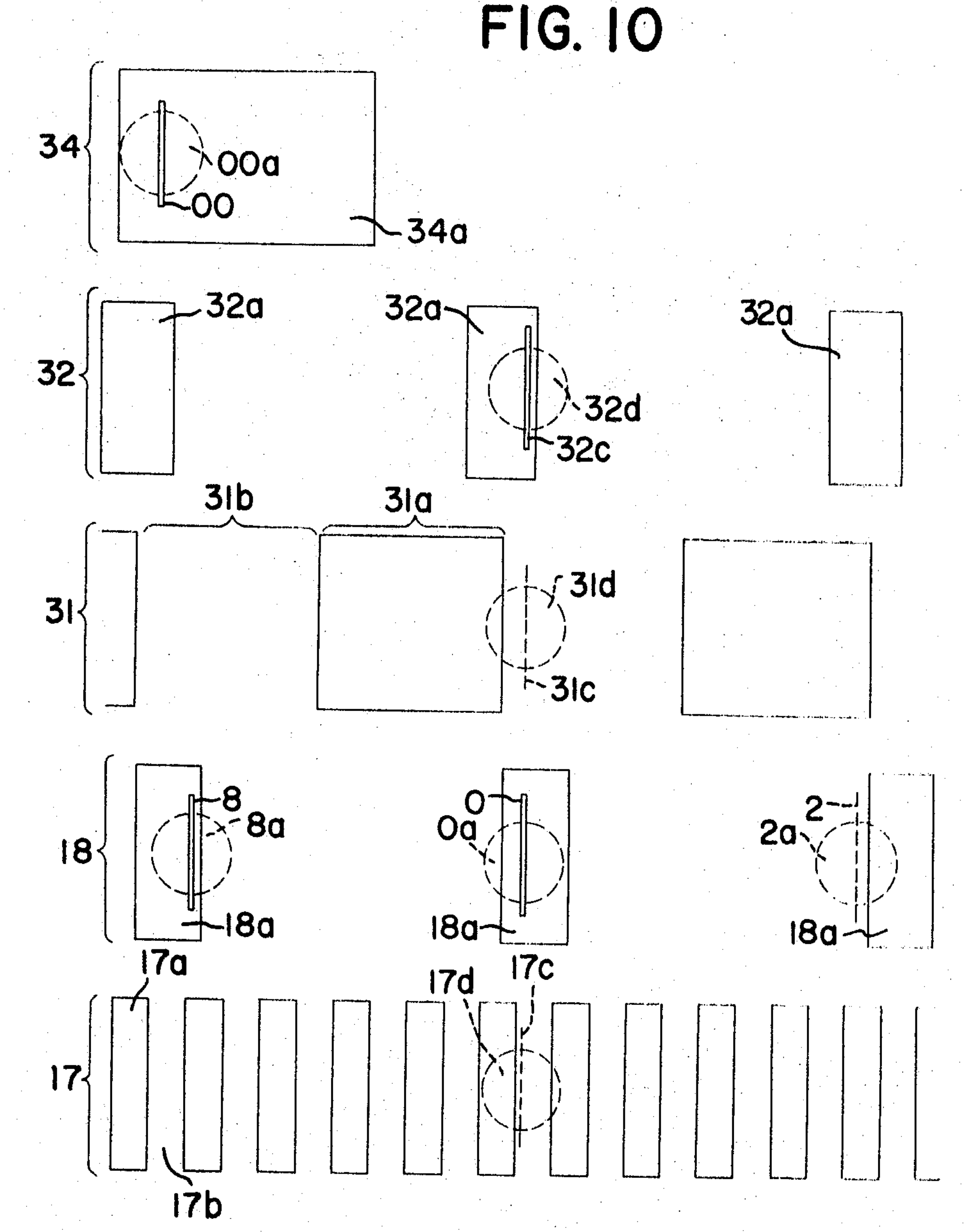
FIG. 10 is a magnified fragmentary front view illustrating the same relativity as in FIG. 3 which however codes decimal numbers of two figures ($10^0$, $10^1$) at the minimum unit 2.
Figure 11:
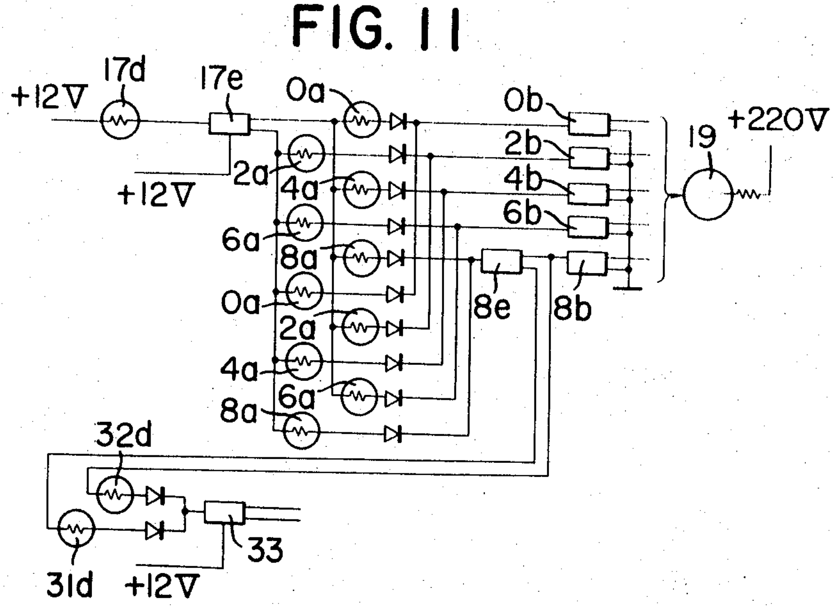
FIG. 11 illustrates a modified electric diagram of FIG. 7 which enables to indicate decimal numbers at the minimum unit 2.

The following preferred embodiment illustrates only the constructions and operations different from those in the foregoing embodiment, now based on the minimum unit 2. In FIG. 10, 31 and 32 show a pair of divisional zones which are used to take figure in the first place ($10^0$) up one place into figures in the second place ($10^1$); in the one divisional zone 31, transparent part 31a are arranged at a uniform interval, from centerline to centerline, equivalent to the width of 10 units of the minimum divisional zone 17, each transparent part having a width equivalent to that of four units plus a marginal width, on both sides of the part, equivalent to width of at least one slit; while in the other divisional zone 32, transparent parts 32a are arranged at a uniform interval, from centerline to centerline, equivalent to the width of 10 units of the minimum divisional zone 17, each transparent part having a width equivalent to that of one unit plus a marginal width, on both sides of the part, equivalent to width of at least one slit. And yet, each pair of a transparent part 31a and a corresponding transparent part 32a is so made as the former takes charge of four units of the minimum divisional zone 17 and the latter takes charge of one unit, the fifth unit, thereof covering five units in total. 31c is a slit made in the fixed disc in correspondence to the divisional zone 31, and 32c is a slit made in the fixed disc in correspondence to the divisional zone 32; the correlativity between the pair of the slits is same as in the foregoing illustrative embodiment. 31d and 32d are a pair of photoelectric elements behind the respective slits 31c and 32c. In FIG. 11, 8e is a two-point switching circuit set on the output side of the photoelectric element 8a in charge of indicating the figure 8 in the first place ($10^0$); to the output sides of the said circuit the said pair of the photoelectric elements 31d and 32d are connected in parallel. 33 is a two-point switching circuit to turn the outputs of the pair of the photoelectric elements 31d and 32d, and the sequences to take a figure up one place are same as in the foregoing illustrative embodiment. The output obtainable by the pair of the elements 31d and 32d are classified in accordance with units of the minimum divisional zone 17 as follows:

| | | photoelectric element 31d | photoelectric element 32d |
|---|---|---|---|
| output | present (ON) | 0–6<br>20–26<br>40–46<br>....... | 8<br>28<br>48<br>.... |
| | absent (OFF) | 8–18<br>28–38<br>48–58<br>....... | 0–6<br>10–26<br>30–46<br>....... |

Accordingly, the switching classification by the two-point switching circuit 32 becomes as follows:

| one side | the other side |
|---|---|
| 0–8 | 10–18 |
| 20–28 | 30–38 |
| 40–48 | 50-58 |
| ....... | ....... |

And thus the figures in the second place are clearly classified alternatingly into two systems.

34 is a divisional zone to indicate decimal numbers in the second place above zero point ($10^1$) and 34a are transparent parts in the divisional group 34 arranged at a uniform interval, from centerline to centerline, equivalent to the width of 50 units of the minimum divisional zone 17, each transparent part 34a having a width equivalent to that of five units plus a marginal width, on both sides of the part, equivalent to width of at least one slit. 00, 10, 20 .... 90 are 10 slits provided in the fixed disc corresponding to the said divisional zone basically at such an interval as one slit appears in a transparent part according as every five units of the minimum divisional zone 17 change angularly, and also at such an interval as a pair of the serially adjoining slits among them will receive rays of light only at the time of figure conversion. 00a, 10a, 20a .... 90a are 10 photoelectric elements set respectively behind the said slits.

Transparent parts of a divisional zone, not shown in the attached figure, to be used to indicate numbers of the third place above zero point ($10^2$) are arranged at a uniform interval, from centerline to centerline, equivalent to the width of 100 units of the minimum divisional zone 17, each transparent part having a width equivalent to that of 45 units plus a marginal width, on both sides of the part, equivalent to at least one slit; while transparent parts of another divisional zone forming a pair with the said zone are arranged at a uniform interval, in the same central phase, equivalent to the width of 100 units of the minimum divisional zone 17, each transparent part having a width equivalent to that of five units plus a marginal width, on both sides of the part, sufficient to cover at least one slit. Thus, 50 units are covered by the pair of the transparent parts.

Figure 13:
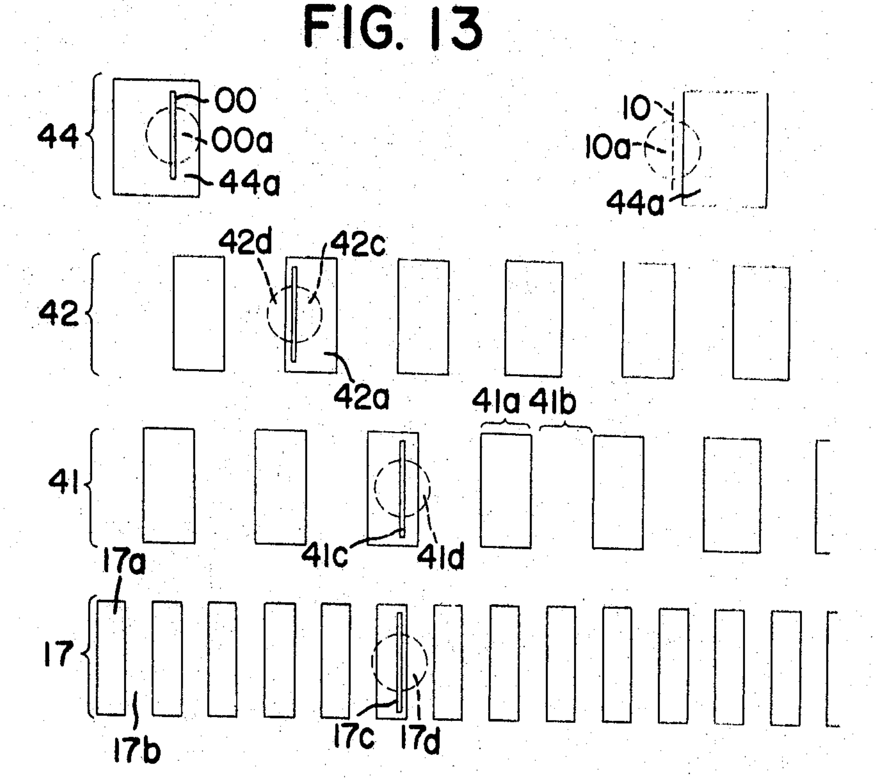
FIG. 13 is a magnified fragmentary front view illustrating the same relativity as in FIG. 3 which however codes the shaft rotation angles into decimal numbers of two figures ($10^0$, $10^1$) at the minimum unit 5.
Figure 14:
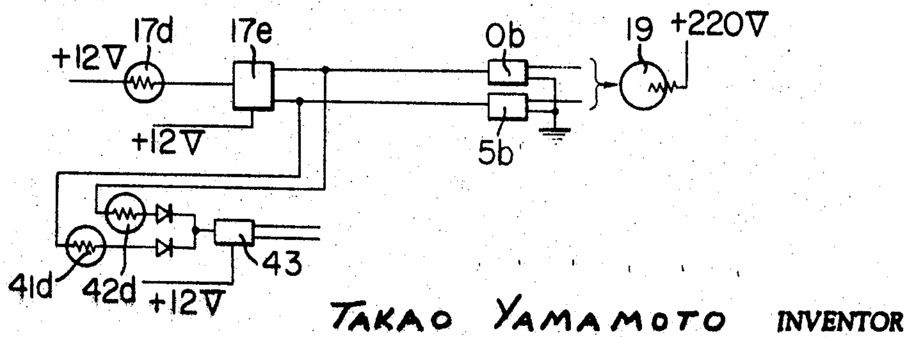
FIG. 14 illustrates a modified electric circuit of FIG. 7 which enables to indicate decimal numbers at the minimum unit 5.

The following preferred embodiment of the AD converter based on minimum unit 5 illustrates on minimum unit 5 illustrates only the constructions different from those in the foregoing, now based on minimum unit 1. Where minimum unit is set to 5, indication of figures in the first place ($n^0$) is limited to 0 and 5. Therefore, a circuit **0*b* to indicate 0 and a circuit 5*b* to indicate 5 are connected directly and respectively to the output side of the said two-point switching circuit 17*e* as shown in FIG. 14. In FIG. 13, 41 and 42 show a pair of divisional zones to be used to indicate figures of the second place ($10^1$), in other words to take up figure one place from the first place ($10^0$), and transparent parts 41*a* and 42*a* are arranged respectively in the said pair of the zones at a uniform interval, from centerline to centerline, equivalent to four units of the smallest divisional group 17, each transparent part having a width equivalent to that of one unit plus a marginal width, on both sides of the part, sufficient to cover at least one slit: the pair of the transparent parts 41*a* and 42*a* therefore take charge of total two units. In correspondence to the pair of the divisional zones, a pair of slits 41*c* and 42*c* and a pair of photoelectric elements 41*d* and 42*d* are furnished as in the foregoing embodiment; a two-point switching circuit 43 to turn the outputs of the parallel pair of the photoelectric elements 41*d* and 42*d* into input is furnished as shown in FIG. 14, and the output side of the two-point switching circuit 43** is connected, as in the foregoing embodiment, to the input sides of the photoelectric elements which are in charge of indicating figures in the second place ($10^1$) and which are controlled under two alternating systems where alternating elements belong to one system and the adjoining elements to the other system.

The output obtainable by the elements **41*d* and 42*d* are classified in accordance with units of the minimum zone 17** as follows.

| | | photoelectric element 41*d* | photoelectric element 42*d* |
| --- | --- | --- | --- |
| output | present (ON) | 0<br>20<br>40<br>.... | 5<br>25<br>45<br>.... |
| | absent (OFF) | 5, 10, 15<br>25, 30, 35<br>45, 50, 55<br>........... | 10, 15, 20<br>30, 35, 40<br>50, 55, 60<br>........... |

Accordingly, the switching classification by the two-point switching circuit 43 becomes as follows:

| one side | the other side |
| --- | --- |
| 0, 5 | 10, 15 |
| 20, 25 | 30, 35 |
| 40, 45 | 50, 55 |
| ...... | ...... |

and thus the figures in the second place ($10^1$) are clearly classified alternatingly into two systems.

44 is a divisional zone to indicate figures of the second place ($10^1$), and **44*a* are transparent parts arranged in the said zone at a uniform interval, from centerline to centerline, equivalent to 20 units of the minimum zone 17, each transparent part having a width equivalent to two units plus a marginal width, on both sides of the part, sufficient to cover at least one slit. 00, 10, 20 .... 90 are 10 slits provided in corresponding positions to the said divisional zone 44 basically at such an interval as one slit appears in a transparent part according as every two units of the minimum divisional zone change angularly, and also at such an interval as a pair of the serially adjoining slits will receive rays of light only at the time of figure conversion. 00*a*, 10*a*, 20*a* .... 90*a* are the photoelectric elements set behind the slits respectively. The following table lists the transparent parts of the divisional zones versus units of the minimum divisional zone 17, pertaining to increase of figure at the minimum units 1, 2 and 5**:

| Minimum unit | Divisional zone | Transparent part | | $10^1$ | $10^2$ | $10^3$ | $10^n$ |
| --- | --- | --- | --- | --- | --- | --- | --- |
| 1 | 21<br>25 | 21a<br>25a | Central phase | 20 | 200 | 2,000 | $2\times10^n$ |
| | . . . | . . . | Width | 9 | 90 | 900 | $9\times10^{n-1}$ |
| | 22<br>26 | 22a<br>26a | Central phase | 20 | 200 | 2,000 | $2\times10^n$ |
| | . . . | . . . | Width | 1 | 10 | 100 | $10^{n-1}$ |
| 2 | 31 | 31a | Central phase | 10 | 100 | 1,000 | $2\times10^{n/2}$ |
| | . . . | . . . | Width | *4 | 45 | 450 | $9\times10^{n1/2}$ |
| | 32 | 32a | Central phase | 10 | 100 | 1,000 | $2\times10^{n/2}$ |
| | . . . | . . . | Width | *1 | 5 | 50 | $10^{n-1/2}$ |
| 5 | 41 | 41a | Central phase | 4 | 40 | 400 | $2\times10^{n/5}$ |
| | . . . | . . . | Width | *1 | 18 | 180 | $9\times10^{n-1/5}$ |
| | 42 | 42a | Central phase | 4 | 40 | 400 | $2\times10^{n/5}$ |
| | . . . | . . . | Width | *1 | 2 | 20 | $10^{n-1/5}$ |

(Figures marked with * are particular ones and not applicable to geometric progression.)

However, a compound width consisting of combination with each width of a pair of transparent portions (21_a_ and 22_a_, and 26_a_, 31_a_, and 32_a_, 41_a_ and 42_a_, etc.) becomes a form of the geometric progression as follows:

| minimum unit | transparent portion | $10^1$ | $10^2$ | $10^3$ | $10^n$ |
|---|---|---|---|---|---|
| 1 | 21a and 22a<br>25a and 26a | 10 | 100 | 1,000 | 10n |
| 2 | 31 31a and 32a | 5 | 50 | 500 | 10n/2 |
| 5 | 41a and 42a | 2 | 20 | 200 | 10n/5 |

| Minimum unit | Divisional zone | Transparent part | | $10^0$ | $10^1$ | $10^2$ | $10^n$ | $10^{n\text{-max.}}$ |
|---|---|---|---|---|---|---|---|---|
| 1 | 18<br>24 | 18a<br>24a | Central phase | 10 | 100 | 1,000 | $10^{n+1}$ | $10^{n+1}$ |
| | . | . | Width | 1 | 10 | 100 | $10^n$ | (*) |
| 2 | 18<br>34 | 18a<br>34a | Central phase | *10 | 50 | 500 | $10^{n+1/2}$ | $10^{n+1/2}$ |
| | . | . | Width | *1 | 5 | 50 | $10^{n/2}$ | (*) |
| 5 | 17<br>44 | 17a<br>44a | Central phase | *1 | 20 | 200 | $10^{n+1/5}$ | $10^{n+1/5}$ |
| | . | . | Width | *1 | 2 | 20 | $10^{n/5}$ | (*) |

(Figures marked with * are particular ones and not applicable to geometric progression.)

FIG. 17 is an another embodiment illustrative of an electric circuit diagram which is capable of indicating both the plus and minus polarities, and the following are the detailed descriptions of differences from the foregoing embodiments. The circuit for indication of decimal figures in the first place above zero point is fundamentally of same construction as that of FIG. 11 based on the minimum unit 2, and in FIG. 17 the figure indication photoelectric elements —0_a_, —2_a_, .... —8_a_, —0_a_, —2_a_ ... —8_a_ in the negative side are set in parallel as those in the positive side, controlled in the two systems where every alternate element belongs to the one system while the every adjoining element belongs to the other system. The circuits for indication of decimal figures in the second and third places above zero point have approximately the similar construction, but the difference is that in input side of the said alternate circuits for indication of figures in the first place in the two systems are divided into the plus side and the minus side, which are connected with the set of the simultaneous switching sides among the four output sides produced in a pair of simultaneously operating switching circuits 45 which are provided on the output side of the two-point switching circuit 17_e_, so that the said pair of the two-point switching circuits 45 will be operated by switching circuit by means of polarity detection stated below. The said circuit 45 is provided to prevent dual indication because otherwise the complementary figures on the minus side are also indicated when figures on the plus side are indicated since all the transparent parts of the divisional zone in charge of indicating figures of the first place are so disposed at a uniform interval along the circumference as may work both in plus and minus phases. The said circuit is not necessitated for figures of the second place or higher for the divisional zone for indication at plus phase and the divisional zone for indication at minus are separated to comply with larger quantity of angular change.

46 is a photoelectric element which operates simultaneously when a photoelectric element (+8_a_) in charge of indicating figure (+8) in the first place operates, and 47 is a photoelectric element which operates simultaneously when a photoelectric element (—0_a_) in charge of indicating the smallest minus figure (—0) in the first place operates, and the two elements are connected in parallel to the output side of the two-point switching circuit 17_e_. 48 is a two-point switching circuit provided on the output side of the said pair of photoelectric elements 46 and 47; 49 is a photoelectric element in charge of increase of figure provided on the side where operating current is switched and supplied at the time when either of the said pair of the photoelectric elements does not have output on the output side of the two-point switching circuit 48; 50 is a photoelectric element in charge of increase of figure provided on the side where operating current is switched and supplied when output is present at either of the said pair of the photoelectric elements; 51 is a two-point switching circuit to turn the output of the pair of the parallel photoelectric elements 49 and 50 into input. 52 is a photoelectric element which operates coincidentally with the operation of a photoelectric element (+90_a_) in charge of indicating the largest plus figure (+9) in the second place and with the operation of a photoelectric element (—00_a_) in charge of indicating the smallest minus figure (—0) in the second place when a divisional zone to indicate figures of the second place on the plus side and a divisional zone to indicate figures of the second place on the minus side are arranged separately (e.g., separately as in FIG. 4 and FIG. 5); 53 is a two-point switching circuit furnished on the output side of the photoelectric element 52; 54 is a photoelectric element provided on the side where operating electric current is switched and supplied at the time when the output of the photoelectric element 52 is absent on the output side of the circuit 53; 55 is a photoelectric element provided on the side where operating electric current is switched and supplied at the time when the output of the photoelectric element 52 is present on the output side of the circuit 53; 56 is a two-point switching circuit provided on the output side of the pair of the photoelectric elements 54 and 55; the operational sequences to increase figures by these arrangements do not differ from those in the foregoing embodiments.

Figure 15:
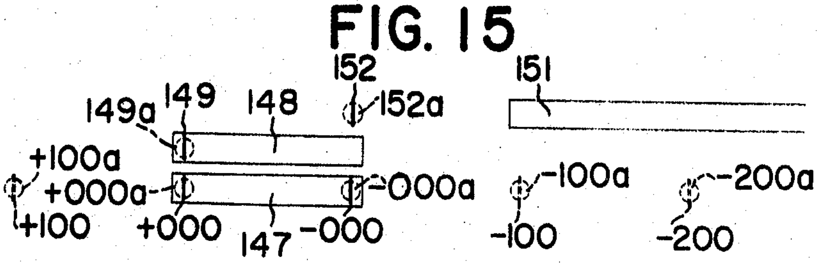
FIG. 15 is a fragmentary front view illustrating the correlation between the divisional zone for polar detection and the slits at a condition where indication of converter decimal numbers in both plus and minus areas is possible.

In FIG. 15, 147 is a transparent part in a divisional zone in charge of indicating figures in the third place, having a width equivalent to the distance between slits set in front of each of serially adjoining photoelectric elements in charge of figure indication and having a marginal width, on both sides of the part, sufficient to cover at least one slit. 148 is a transparent part with the same phase and width as the transparent part 147, and 149 is a slit made in a position corresponding to the said transparent part and the slit 149 is positioned in the same phase as the slit 000 which is corresponding to the smallest figure 0 in plus area in the third place. In FIG. 17, 150 is a two-point switching circuit provided on the output side of the photoelectric element —000_a_ in charge of indicating the smallest figure 0 in minus area in the third place; 149_a_ is a photoelectric element behind the slit 149 and is provided on the side where operating electric current is switched and supplied at the time when the output of the photoelectric element —000_a_ is present on the output side of the said two-point switching circuit 150. In FIG. 15, 151 is a transparent part ranging from the point, at a distance equivalent to the width of the transparent part 148 minus the width of at least one slit from the preceding borderline of the transparent part 148, to the point to form a semicircumference, and having a width of a circumference minus a width equivalent to that of the transparent part 148 plus a marginal width, on both sides of the part 151, to cover at least one slit; therefore, the width of the transparent part 151 and the width of the transparent part 148 are equal to the width of a semicircumference plus at least two slits in total. 152 is a slit set in the same phase as the slit −000 which corresponds to the figure −0 in the third place on the position corresponding to the said transparent part; **152*a* is a photoelectric element behind the said slit, connected to the output side of the two-point switching circuit 150 and provided on the side where operating electric currency is switched and supplied when the output of the said photoelectric element −000*a* is absent. 153 is a two-point switching circuit to turn the output of the pair of the parallel photoelectric elements 149*a* and 152*a* into input, and the said pair of the two-point switching circuit 45** is switched by the output of this circuit.

With reference to the polarity detection operation, the operative and nonoperative ranges of a pair of the photoelectric elements **149*a* and 152*a*** are classified as in the following table:

| | operative | nonoperative |
|---|---|---|
| photoelectric element 149*a* | +000—+099 | +100—+999<br>−000—−999 |
| photoelectric element 152*a* | +100—+999<br>−000—−999 | +000—+099 |

The operative range of the above table is further classified into the final output obtainable range and unobtainable range as follows:

| output obtainable | output unobtainable |
|---|---|
| +000—+099<br>+100—+999 | −000—−999 |

and thus the output obtainable range is clearly classified into plus area and the output unobtainable range into minus area. The said pair of the two-point switching circuit 45 operates complying with the output signals.

Figure 16:
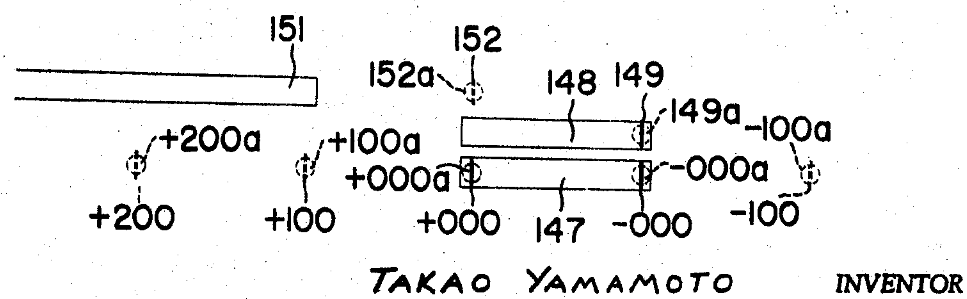
FIG. 16 is a modified fragmentary front view of FIG. 15.

FIG. 16 shows an opposite arrangement to the FIG. 15's where a two-point switching circuit 150 is connected to the output side of the photoelectric element **+000*a* in charge of indicating the smallest figure +000 in the minus area in the third place; the same effect is obtained in this arrangement as in the FIG. 15**.

In the present invention, as shown in the foregoing preferred embodiments, all the divisional zones on the rotary disc are classified largely into two functional groups to take charge of indicating decimal numbers and to take charge of changing and increasing figures, and all the transparent parts in the divisional zones, except the minimum divisional zone 17, are given expanded width to both sides of them to move the borderlines sidewards than the regular ones; the decisions for indications and changes of figures are made by ON/OFF signals obtained by the units of the minimum divisional zone 17, and ON/OFF signals to alternatingly switch and change figures based on units of every line are also obtained in the other divisional zones in charge of changing and increasing figures; throughout the lines, the input sides of the photoelectric elements taking charge of indicating decimal numbers are controlled under two systems where the alternating photoelectric systems belong to the one system and the adjoining ones belong to the other system, and figures are changed directly one by one by means of the ON/OFF signals in every line, but finally decisions for indications and changes of all the figures are made by the ON/OFF signals obtained by the units of the minimum divisional zone. Since such a peculiar method to increase figures and such a peculiar method to prevent ambiguity in the borderline area are developed according to the present invention, the rotation angles of the shaft are converted and indicated quite precisely into decimal numbers, and fundamentally only 12 pieces of the photoelectric elements, 10 pieces for indication of decimal numbers and two pieces for increase of figure, are required for one figure; and even when the indication of the maximum number 1,000 is required at the minimum unit 1, the required quantity of the units of the minimum divisional zone is only 1,000. Consequently, the AD converter according to the invention is made only about half the size of a conventional one, is capable of indicating figures in both plus and minus areas with no additional complementary conversion circuit, and gives many other merits and advantages.

What is claimed is:

1. An analog-digital converter comprising a rotary disc mounted on a shaft and illuminated on one side by a light source, said rotary disc consisting of a plurality of concentrically formed divisional zones having alternately arranged transparent and opaque portions; a fixed disc disposed opposite to the rotary disc at the nonilluminated side thereof, said fixed disc containing light-transmitting slits; photoelectric elements arranged behind said slits capable of being illuminated through said slits and the transparent portions of said rotary disc by means of said light source; a first system including a first divisional zone and a photoelectric element in a corresponding position to the first divisional zone, in said first divisional zone minimum units having alternate transparent and opaque portions of uniform width, an alternate ON-OFF signal emitting from the photoelectric element whenever the first divisional zone shifts the minimum units, a two-point switching circuit by which electric current is supplied to one side in reply to ON signal and to opposite side in reply to OFF signal raised from the photoelectric element; in each figure a second system including a second divisional zone and 10 photoelectric elements in corresponding positions to said second divisional zone, in said second divisional zone transparent portions with a width equivalent to that of the minimum unit, 1 at the first figure, 10 at the second figure, 100 at the third figure, and marginal width sufficient to cover at least one slit each on both sides of the transparent portions arranged centering in each phase corresponding to the 10th unit at the first figure, the 100th unit at the second figure, the 1,000th unit at the third figure, of the minimum units, an arranging interval of the 10 photoelectric elements wherein only one among the 10, and adjacent two at every converting borders, are exposed in numerical order to the passing light whenever the second divisional zone shifts equivalent to the width of 1 at the first figure, 10 at the second figure, 100 at the third figure of the minimum units, two connecting means by which the input sides of the 10 photoelectric elements are divided into two groups of which the one assigned to the even numbers and the other assigned to the odd numbers; in each figure a third system including a pair of divisional zones and a pair of photoelectric elements made in the corresponding positions to the pair of divisional zones respectively, in the one divisional zone transparent portions having a width equivalent to that of the minimum unit, 9 at the first figure, 90 at the second figure, 900 at the third figure, and marginal width sufficient to cover at least one slit each on both sides of the transparent portions and arranged centering in each phase corresponding to the 20th unit at the first figure, the 200th unit at the second figure, the 2,000th unit at the third figure, of the minimum units, in the other divisional zone transparent portions which have a width equivalent to that of the minimum unit, 1 at the first figure, 10 at the second figure, 100 at the third figure, and marginal width sufficient to cover at least one slit each on both sides of the transparent portions and are arranged centering in each phase corresponding to the 20th unit at the first figure, the 200th unit at the second figure, the 2,000th unit at the third figure, of the minimum units, the pair of photoelectric elements connected respectively with ON side and OFF side of output of the photoelectric element for the highest number where one place down, an alternate compound ON-OFF signal whenever the pair of divisional zones shift equivalent to the width of 10 at the second figure, 100 at the third figure, of the minimum units, a two-point switching circuit by which electric current is supplied to one side in reply to ON signal raised from either one of the pair and is supplied to opposite side in reply to OFF signal raised from both of them; and in each figure a means connected the one side and the opposite side of the output of the said two-point switching circuit in the first system, in the third system, with the said two groups of the inputs of the said 10 photoelectric elements respectively.

2. An analog-digital converter according to claim 1, wherein in the second system including the second divisional zone transparent portions having a width equivalent to that of the minimum unit, 1 at the first figure, 5 at the second figure, 50 at the third figure, and marginal width sufficient to cover at least one slit each on both sides of the transparent portions and arranged centering in each phase corresponding to the 10th unit at the first figure, the 50th unit at the second figure, the 500th unit at the third figure, of the minimum units, an arranging interval of the 10 photoelectric elements which only one among the 10, but adjacent two at every converting borders, are exposed in numerical order to the passing light whenever the second divisional zone shifts equivalent to the width of 1 at the first figure, 5 at the second figure, 50 at the third figure, of the minimum units, in the first figure only two connecting means by which the input sides of the 10 photoelectric elements are divided into two groups of which the one assigned to photoelectric elements for numbers of 0, 4, 8, 2 and 6, and the other assigned to photoelectric elements for numbers of 2, 6, 0, 4 and 8; in the third system including the pair of divisional zones, in the one divisional zone transparent portions which have a width equivalent to that of the minimum unit, 4 at the first figure, 45 at the second figure, 450 at the third figure, plus marginal width sufficient to cover at least one slit each on both sides of the transparent portions and arranged centering in each phase corresponding to the 10th unit at the first figure, the 100th unit at the second figure, the 1,000th unit at the third figure, of the minimum units, in the other divisional zone transparent portions which have a width equivalent to that of the minimum unit, 1 at the first figure, 5 at the second figure, 50 at the third figure,—, plus marginal width sufficient to cover at least one slit each on both sides of the transparent portions and are arranged centering in each phase corresponding to the 10th unit at the first figure, the 100th unit at the second figure, the 1,000th unit at the third figure,—, of the minimum units, an alternate compound ON-OFF signal emitting from the pair of photoelectric elements whenever the pair of divisional zones shift equivalent to the width of 5 at the second figure, 50 at the third figure,—, of the minimum units.

3. An analog-digital converter according to claim 1, wherein in the first system a two-point switching circuit by which electric current is supplied alternately to a pair of indicating circuits of number 0 and 5 in the first figure; in the second system including the second divisional zone transparent portions which have a width equivalent to that of the minimum unit, 2 at the second figure, 20 at the third figure, plus marginal width sufficient to cover at least one slit each on both sides of the transparent portions and are arranged centering in each phase corresponding to the 20th unit at the second figure, the 200th unit at the third figure, of the minimum units, an arranging interval of the 10 photoelectric elements which only one among the 10, but adjacent two at every converting borders, are exposed in numerical order to the passing light whenever the second divisional zone shifts equivalent to the width of 2 at the second figure, 20 at the third figure, of the minimum units; in the third system including the pair of divisional zones, in the one divisional zone transparent portions which have a width equivalent to that of the minimum unit, 1 at the first figure, 18 at the second figure, 180 at the third figure, plus marginal width sufficient to cover at least one slit each on both sides of the transparent portions and are arranged centering in each phase corresponding to the 4th unit at the first figure, the 40th at the second figure, the 400th at the third figure, of the minimum units, in the other divisional zone transparent portions which have a width equivalent to that of the minimum unit, 1 at the first figure, 2 at the second figure, 20 at the third figure, plus marginal width sufficient to cover at least one slit each on both sides of the transparent portions and are arranged centering in each phase corresponding to the 4th unit at the first figure, the 40th unit at the second figure, the 400th unit at the third figure, of the minimum units, an alternate compound ON-OFF signal emitting from the pair of photoelectric elements whenever the pair of divisional zones shift equivalent to the width of 2 at the second figure, 20 at the third figure, of the minimum units.

4. An analog-digital converter according to claim 1, wherein in the second system the second divisional zone having a transparent portion for the highest figure with free from phasic limitation, 20 photoelectric elements made in the corresponding position to the second divisional zone, a connecting means by which the input sides of the 20 photoelectric elements are divided into two groups of which the one group assigned to the even numbers in plus area and the odd numbers in minus area and the other group assigned to the even numbers in minus area and the odd numbers in plus area, at the first figure a connecting means by which the input sides of the 20 photoelectric elements are divided into four groups of which the first group assigned to the even numbers in plus area and the second group assigned to the odd numbers in minus area and the third group assigned to the odd numbers in plus area and the fourth group assigned to the even numbers in minus area; in the third system a two-point switching circuit provided to the output of the photoelectric element for the highest number where one place down in plus area, a two-point switching circuit provided to the output of the photoelectric element for the highest number where one place down in minus area; a fourth system including a pair of divisional zones and a pair of photoelectric elements made in the corresponding positions to the pair of divisional zones respectively, in the one divisional zone a transparent portion having the same phase and width as the transparent portion for the highest figures in the second divisional zone, in the other divisional zone a transparent portion having a width of a semicircumference of the rotary disc minus the width equivalent to that of the transparent portion in the one divisional zone plus a marginal width sufficient to cover at least one slit on both sides thereof and arranged in the phase at a distance equivalent to the width of the transparent portion in the one divisional zone from the preceding borderline of the transparent portion in the one divisional zone, the pair of photoelectric elements connected with ON side and OFF side of the output of the photoelectric element for the highest number in minus area at the highest figure respectively, the one photoelectric element made in the same phase as the photoelectric element for the lowest number in plus area at the highest figure in the position coinciding with the transparent portion in the one divisional zone, the other photoelectric element made in the same phase as the photoelectric element for the highest number in minus area at the highest figure in the position coinciding with the transparent portion in the other divisional zone, a two-point switching circuit provided on the output side of the pair of photoelectric elements, a pair of two-point switching circuits operated by the output of the two-point switching circuit and provided on the output of the two-point switching circuit in the first system and connected the four outputs thereof with the four inputs divided into four groups of the photoelectric elements in the first system respectively.

5. An analog-digital converter according to claim 1, wherein in the third system the pair of photoelectric elements connected respectively with ON side and OFF side of the output of the photoelectric element for the lowest number where one place down.

6. An analog-digital converter according to claim 1, wherein in the third system the pair of photoelectric elements connected respectively with ON side and OFF side of the output of the photoelectric element provided separately in a phase to work simultaneously with the operation of the photoelectric element for the highest number where one place down.

7. An analog-digital converter according to claim 5, wherein in the third system the pair of photoelectric elements connected respectively with ON side and OFF side of the output of the photoelectric element provided separately in a phase to work simultaneously with the operation of the photoelectric element for the lowest number where one place down.

8. An analog-digital converter according to claim 4, wherein in the third system a two-point switching circuit provided to the output of the photoelectric element for the lowest number where one place down in plus area.

9. An analog-digital converter according to claim 4, wherein in the third system a two-point switching circuit provided to the output of the photoelectric element for the lowest number where one place down in minus area.

10. An analog-digital converter according to claim 4, wherein in the third system a two-point switching circuit provided to the output of the photoelectric element provided separately in a phase to work simultaneously with the operation of the photoelectric element for the highest number where one place down in plus area.

11. An analog-digital converter according to claim 4, wherein in the third system a two-point switching circuit provided to the output of the photoelectric element provided separately in a phase to work simultaneously with the operation of the photoelectric element for the highest number where one place down in minus area.

12. An analog-digital converter according to claim 8, wherein in the third system a two-point switching circuit provided to the output of the photoelectric element provided separately in a phase to work simultaneously with the operation of the photoelectric element for the lowest number where one place down in plus area.

13. An analog-digital converter according to claim 9, wherein in the third system a two-point switching circuit provided to the output of the photoelectric element provided separately in a phase to work simultaneously with the operation of the photoelectric element for the lowest number where one place down in minus area.

14. An analog-digital converter according to claim 1, wherein in the second system at the highest figure the second divisional zone having a single transparent portion with free from phasic limitation.

15. An analog-digital converter according to claim 2, wherein in the second system at the highest figure the second divisional zone having a single transparent portion with free from phasic limitation.

16. An analog-digital converter according to claim 3, wherein in the second system at the highest figure the second divisional zone having a single transparent portion with free from phasic limitation.

17, An analog-digital converter according to claim 4, wherein in the second system at the first figure a connecting means by which the input sides of the twenty photoelectric elements are divided into four groups of which the first group assigned to 0, 4, 8, 2 and 6 of numbers in plus area and the second group assigned to 2, 6, 0, 4 and 8 of numbers in plus area and the third group assigned to 0, 4, 8, 2 and 6 of numbers in minus area and the fourth group assigned to 2, 6, 0, 4 and 8 of numbers in minus area.

* * * * *